(12) United States Patent
Nagaraja et al.

(10) Patent No.: US 11,500,911 B2
(45) Date of Patent: Nov. 15, 2022

(54) DESCRIPTIVE TEXT GENERATION FOR DATA VISUALIZATIONS

(71) Applicant: SAP SE, Walldorf (DE)

(72) Inventors: Pavan Kowshik Santebidanur Nagaraja, Bangalore (IN); Reshma L Raghu, Bangalore (IN)

(73) Assignee: SAP SE, Walldorf (DE)

(*) Notice: Subject to any disclaimer, the term of this patent is extended or adjusted under 35 U.S.C. 154(b) by 210 days.

(21) Appl. No.: 16/050,885

(22) Filed: Jul. 31, 2018

(65) Prior Publication Data

US 2020/0042646 A1    Feb. 6, 2020

(51) Int. Cl.
| | | |
|---|---|---|
| *G06F 3/0486* | (2013.01) | |
| *G06F 16/34* | (2019.01) | |
| *G06F 16/904* | (2019.01) | |
| *G06F 40/186* | (2020.01) | |

(52) U.S. Cl.
CPC .......... *G06F 16/345* (2019.01); *G06F 3/0486* (2013.01); *G06F 16/904* (2019.01); *G06F 40/186* (2020.01)

(58) Field of Classification Search
CPC .... G06F 16/345; G06F 16/904; G06F 3/0486; G06F 17/248; G06F 40/186
See application file for complete search history.

(56) References Cited

U.S. PATENT DOCUMENTS

| | | | |
|---|---|---|---|
| 9,141,545 B2 | 9/2015 | Sonwane et al. | |
| 9,384,575 B2 | 7/2016 | Armitage | |
| 9,430,558 B2 | 8/2016 | Bhat et al. | |
| 2010/0095197 A1* | 4/2010 | Klevenz | G06F 16/972 715/234 |
| 2011/0029853 A1 | 2/2011 | Garrity et al. | |
| 2014/0157170 A1 | 6/2014 | Elias | |
| 2014/0164255 A1* | 6/2014 | Daly | G06Q 10/0631 705/80 |
| 2014/0247268 A1* | 9/2014 | Drucker | G06T 11/206 345/440.2 |
| 2015/0161108 A1* | 6/2015 | Back | G06F 40/56 704/9 |
| 2015/0293948 A1 | 10/2015 | Sonwane et al. | |
| 2015/0324075 A1* | 11/2015 | Schulze | G06F 3/0484 715/760 |
| 2015/0370888 A1 | 12/2015 | Fonseca E Costa et al. | |
| 2015/0379510 A1* | 12/2015 | Smith | G06Q 20/3829 705/71 |
| 2016/0028552 A1* | 1/2016 | Spanos | H04L 9/3268 713/178 |
| 2016/0124909 A1 | 5/2016 | Basson et al. | |
| 2017/0039193 A1 | 2/2017 | Mustafi et al. | |
| 2017/0169853 A1* | 6/2017 | Hu | H04N 21/233 |
| 2018/0365201 A1* | 12/2018 | Hunn | G06Q 10/10 |

\* cited by examiner

*Primary Examiner* — Phenuel S Salomon
(74) *Attorney, Agent, or Firm* — Fish & Richardson P.C.

(57) ABSTRACT

Methods, systems, and computer-readable storage media for automatically providing descriptive text to a narrative application, and operations can include receiving, from the narrative application, a request for descriptive text, the request including analytical data, and data indicating a template, in response to the request, merging at least a portion of the analytical data and the template to provide a descriptive text, merging being executed using at least one regular expression, and transmitting a response to the narrative application, the response including the descriptive text.

15 Claims, 11 Drawing Sheets

DESCRIPTIVE TEXT GENERATION FOR DATA VISUALIZATIONS

BACKGROUND

Data analytics involves processing data to identify trends, and/or patterns. Visualizations can be provided from the analytics, which can provide an efficient means for conveying the trends, and/or patterns found in the underlying data. However, larger amounts of data can result in relatively complex visualizations, which can be more difficult to extract information from. For such complex visualizations, text can be included to describe trends, patterns, and/or other information the visualizations are meant to convey.

SUMMARY

Implementations of the present disclosure are directed to generating descriptive text for data visualizations. More particularly, implementations of the present disclosure are directed to generic text templates, and user interfaces for generating descriptive text.

In some implementations, actions include receiving, from the narrative application, a request for descriptive text, the request including analytical data, and data indicating a template, in response to the request, merging at least a portion of the analytical data and the template to provide a descriptive text, merging being executed using at least one regular expression, and transmitting a response to the narrative application, the response including the descriptive text. Other implementations of this aspect include corresponding systems, apparatus, and computer programs, configured to perform the actions of the methods, encoded on computer storage devices.

These and other implementations can each optionally include one or more of the following features: merging at least partially includes determining at least one value based on an analytical function of the template, and the at least a portion of the analytical data, the at least one value being included in the descriptive text; the data indicating a template includes a chart type, the template including a default template that is selected based on the chart type; the data indicating a template includes a template identifier, the template being retrieved from a datastore based on the template identifier; the at least one regular expression is determined to match at least a portion of the template; the request further includes customization data that adjusts an index referenced by an analytical function included in the template; and actions further include modifying the template based on user input indicating selection of an analytical function that is to be added to the template, the analytical function being added to the template using drag-and-drop functionality of a user interface.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to generating descriptive text for data visualizations. More particularly, implementations of the present disclosure are directed to generic text templates, and user interfaces for generating descriptive text. Implementations can include actions of receiving, from the narrative application, a request for descriptive text, the request including analytical data, and data indicating a template, in response to the request, merging at least a portion of the analytical data and the template to provide a descriptive text, merging being executed using at least one regular expression, and transmitting a response to the narrative application, the response including the descriptive text.

To provide context for implementations of the present disclosure, and as introduced above, data analytics involves processing data to identify trends, and/or patterns. Visualizations can be provided from the analytics, which can provide an efficient means for conveying the trends, and/or patterns found in the underlying data. However, larger amounts of data can result in relatively complex visualizations, which can be more difficult to extract information from. For example, because of the large amount of data, a resulting visualization might not provide important details at first glance, and may require detailed discussion, and/or description. Further, visualizations, particularly complex visualizations, are not readily understandable by some people, who may prefer information that is to be conveyed in the visualization in the form of descriptive text. Consequently, visualizations can be accompanied by text that describes trends, patterns, and/or other information the visualizations are meant to convey.

Generation of descriptive text can be a complex, resource-consuming process. Systems have been developed to assist in this process. Example systems can include natural language generators (e.g., provided as computer-executable applications), which convert raw data into human-readable text. However, such systems have limitations. For example, different viewers may be looking for different aspects in a data set, and/or a visualization. For example, user A might be interested in average sales revenue across all regions, while user B might be interested in maximum sales revenue over a period of time. The generated text might not capture this information for either or both users. As another example, some systems enable domain-specific templates to be developed. However, because the templates are specific to a particular domain, they are not reusable across other domains.

In view of the foregoing, and as described in further detail herein, implementations of the present disclosure provide a descriptive text platform that provides generic text templates for generating descriptive text from analytical data. In some implementations, the descriptive text platform is integrated within a narrative application. An example narrative application includes an application for generating presentations incorporating visualizations, and descriptive text (e.g., PowerPoint provided by Microsoft, Inc.). In some implementations, the descriptive text platform is provided as a stand-alone application that can receive calls from, and provide responses to one or more narrative applications.

Figure 1:
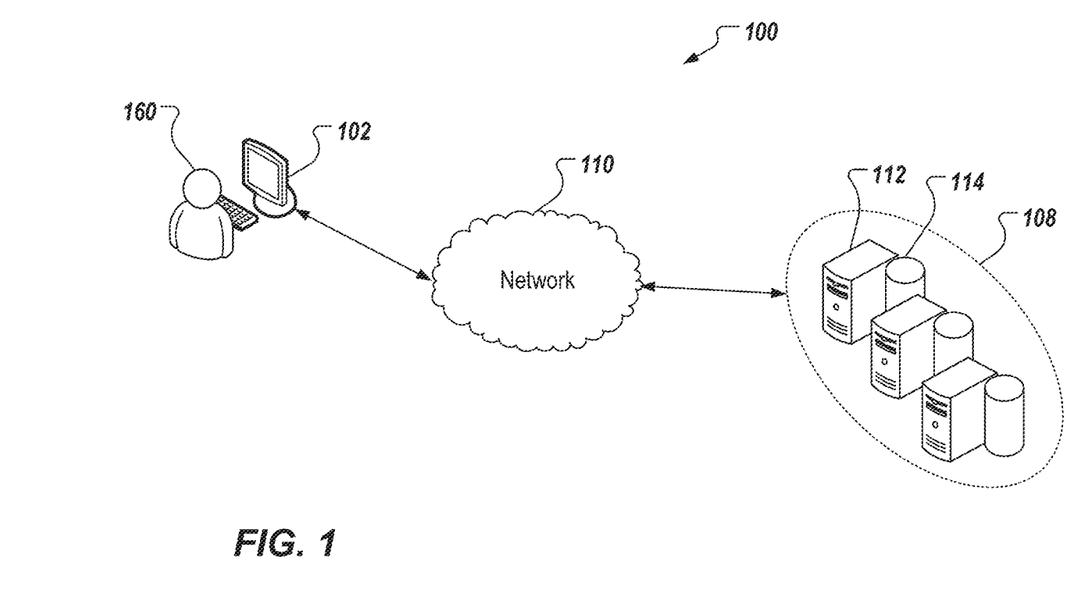
FIG. 1 depicts an example architecture that can be used to execute implementations of the present disclosure.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the back-end system 108 includes at least one server system 112, and data store 114 (e.g., database). In some examples, the at least one server system 112 hosts one or more computer-implemented services that users can interact with using computing devices. For example, the server system 112 can host a computer-implemented descriptive text platform in accordance with implementations of the present disclosure.

Figure 2:
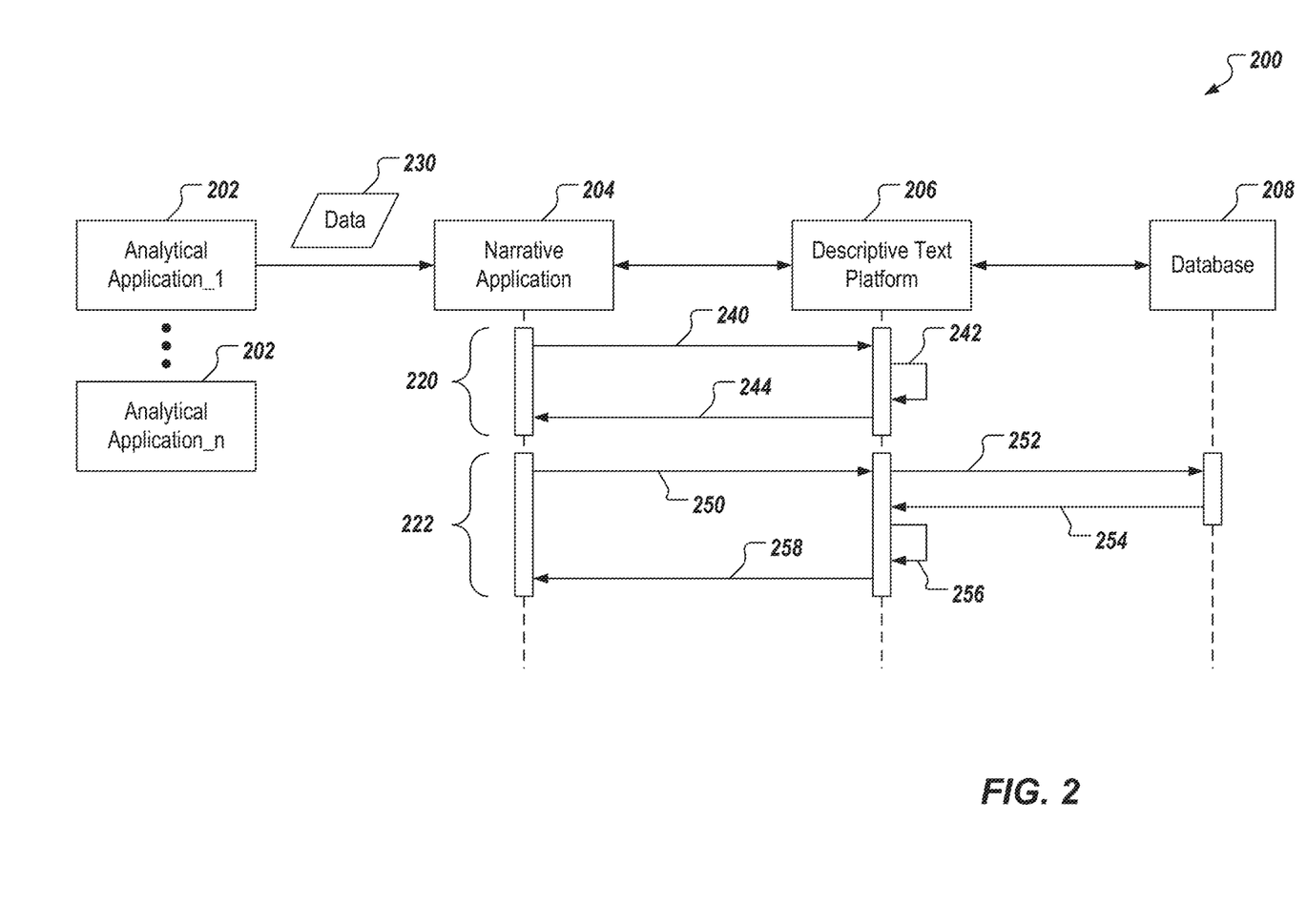
FIG. 2 depicts a conceptual diagram in accordance with implementations of the present disclosure.

FIG. 2 depicts a conceptual diagram 200 in accordance with implementations of the present disclosure. The example conceptual architecture includes analytical applications 202, a narrative application 204, a descriptive text framework 206, and a database 208. The example conceptual architecture 200 also depicts a first example workflow 220, and a second example workflow 222 in accordance with implementations of the present disclosure.

In accordance with implementations of the present disclosure, analytical data 230 is provided from an analytical application 202. In some examples, at least a portion of the analytical data 230 corresponds to a data visualization. In some implementations, the data is analyzed, and one or more statistics are determined. Accordingly, the analytical data 230 can include raw data (e.g., dimensions, measures), at least a portion of which can be used to determine statistics (e.g., min, max, average, median, deviation). As described in further detail herein, at least a portion of the analytical data 230 can be stitched into sentences to provide descriptive text for the data visualization. That is, at least a portion of the analytical data 230 is included in one or more templates, each template providing descriptive text for the data visualization. In some implementations, the descriptive text platform enables users to search for a template from a database. In some examples, the database stores templates (e.g., previously created templates, best-suited templates, default templates) for user selection.

In some implementations, the descriptive text platform determines best-suited templates for the given data, and/or data visualization, and uses such templates to provide the descriptive text. In some examples, a best-suited template for a data visualization can be described as a template that ensures that the resulting descriptive text is relevant to the data visualization, and/or the particular user. In some examples, a data visualization can be associated with a plurality of templates, each template having been previously used for the particular data visualization. In some examples, each template is associated with a weight that reflects a frequency of use of the respective template (e.g. more frequently used templates have a higher weight for the particular data visualization). In some examples, the best-suited template is selected as the template having the highest weight.

As also described in further detail herein, implementations of the present disclosure enable users to edit, and/or create templates. In some examples, multiple editing tools are provided, and include, without limitation, a menu of analytical functions, which can be dragged-and-dropped into a template to embed within descriptive text.

In the example of FIG. 2, the narrative application 204 receives the analytical data 230, and coordinates with the descriptive text platform 206 for provision of descriptive text. The example workflow 220 depicts an example of the narrative application 204 requesting 240 descriptive text based on one or more default templates. In some examples, the one or more default templates are provided based on the type of visualization that the descriptive text is to accompany. For example, the request can include data indicating a visualization type (e.g., bar chart, line chart, hierarchy chart, waterfall chart, scatter chart, pie chart). In some examples, the request includes at least a portion of the analytical data 230, which is to be used to at least partially populate the default template(s). The descriptive text platform 206 generates 242 the descriptive text, and transmits 244 the descriptive text to the narrative application.

The example workflow 222 depicts an example of the narrative application 204 requesting 250 descriptive text based on one or more custom templates. In some examples, the one or more custom templates are created, and stored in the database 208. For example, a user can interact with the descriptive text platform 206 to create a custom template, as described by way of example herein. In some examples, the request can include a template identifier that is unique to the custom template that is to be used. In some examples, the request includes at least a portion of the analytical data 230, which is to be used to at least partially populate the custom template(s). The descriptive text platform 206 requests one or more custom templates using respective template identifiers from the database 208, which returns 254 the requested custom templates. The descriptive text platform 206 generates 256 the descriptive text, and transmits 258 the descriptive text to the narrative application.

In some implementations, the descriptive text platform of the present disclosure, is able to import analytical data from any analytics application (e.g., analytical applications 202 of FIG. 2). A relatively simple representation of data can be a visualization name (e.g., Sales Revenue per City), a visualization type (e.g., bar chart), and visualization data (e.g., included in the analytical data 230 of FIG. 2). In some examples, the analytical data provided from an analytical application is converted to a data representation format (e.g., the relatively simple representation described immediately above), and is processed by the descriptive text framework.

In some implementations, a regular expression search and replace is performed (taking into account the customization data, if any) to merge data with the templates. In some implementations, one or more regular expressions are compared to a template to identify respective matches, if any. In the event of a match within the template, the match is replaced with a value from the provided analytical data (e.g., a value within an array). Examples are described in further detail herein.

As described in further detail herein, the descriptive text framework fetches templates, and merges the templates with analytical data to provide the descriptive text. In some implementations, a template can be provided as a sentence having one or more analytical functions embedded therein. The analytical functions can be used in conjunction with analytical data produce meaningful, and context sensitive descriptive text. An example template can be provided as:

This chart aims to explain [dim(0)] versus [mea(0)].

In this example, [dim(0)] and [mea(0)] are analytical functions. In some examples, [dim(0)] is an analytical function that is used to insert dimensions. In some examples, [mea(0)] is an analytical function that is used to insert measures.

As a non-limiting example, the analytical data can include dimensions of [Quarter, City], and measures of [Sales Revenue, Margin]. Accordingly, the dimensions, and the measures are provided in respective arrays. In some implementations, for each array, a regular expression is provided, and is compared to the template to identify any matches. In this example, [dim(0)] and [mea(0)] would be identified as matches to respective regular expressions. Consequently, the example template above would provide the following example text:

This chart aims to explain Quarter versus Sales Revenue.

In some examples, the number within the parentheses represents the index to be used to pick data from the provided dimensions, and measures. Consequently, if the template were to read "This chart aims to explain [dim(1)] versus [mea(1)]," then the descriptive text would be provided as "This chart aims to explain City versus Margin." Accordingly, the templates of the present disclosure are stateless, and can be used with any analytical data to provide meaningful descriptive text.

Example pseudo-code for performing the regular expression search and replace for the above example can be provided as:

Listing 1: Example Pseudo-Code

```
dimArray = [Quarter, City]
measArray = [Sales Revenue, Margin]
String = "This chart aims to explain [dim(0)] versus [mea(0)]."
for i = 0; i < dimarray.count; i++ {
  string.replace ("dim(i)" with dimArray[i]
}
```

Listing 1: Example Pseudo-Code

```
for i = 0; i < measarray.count; i++ {
  string.replace ("meas(i)" with measArray[i]
}
```

In some implementations, the regular expression search and replace can be based on more complex regular expressions that include ranges. An example regular expression can include, without limitation, [mea([0-9])], which includes a range of measures (e.g., 10 measures in this example). In this manner, multiple matches can be determined for a single regular expression.

In some implementations, the descriptive text provided from a default template can be customized based on customization data. In this manner, a default template can be reused for disparate scenarios, avoiding the need for a default template for each scenario (e.g., a default template for every index change). For example, and as introduced above, a default template can include "This chart aims to explain [dim(0)] versus [mea(0)]." Reuse of this template may be desired for Margin (mea(1)) instead of Sales Revenue (mea(0)), which is indicated in the default template.

In some implementations, the customization data is used to adjust the index that is to be referenced by an analytical function. In some examples, the context data results in a modification of the analytical function. For example, and continuing with the example above, example customization data can be provided as [mea:[1]], which instructs the descriptive text platform that the first instance of the measure function found is to be replace in the index with 1. With this additional information, the descriptive text platform provides a different descriptive text (e.g., "This chart aims to explain Quarter versus Margin") than would have been provided with the default template. In this manner, the templates remain stateless, and can be used with any data. Accordingly, it can be seen that [mea(0)], [mea(1)] fall under the regular expression [mea([0-9])] (e.g., assuming there are 10 measures).

In some examples, to make sure the merging is complete for every given template, the regular expression of each function is searched, and is replaced with calculated data. Using an average function [avg(0)] as a non-limiting example, the descriptive text platform calculates the average of measure at index 0. Flexibility lies in the fact that if one user uses this for the chart "Sales versus City," the average of Sales is returned, while, if another user uses this for the chart "Margin versus City," the average of Margin is returned. Again, the average function is an example, and implementations of the present disclosure can be realized using any appropriate functions (e.g., standard deviation, change percentage, range).

By way of non-limiting example, a template can include [mea(0)], [dim(0), [avg(0)], and [total(0)], and the analytical data can include dimensions [Quarter, City], measures [Sales Revenue, Margin], and Sales Revenue [5, 10, 15, 20]. The descriptive text platform process the analytical data in view of the template to provide descriptive text that includes Sales revenue, Quarter, 12.5, and 50.

In some implementations, the descriptive text platform provides search functionality that enables users to search for templates. Example search functionality includes, but is not limited to, most-recent templates, and popular templates. In some examples, most-recent templates include one or more templates that are relatively newly created templates (e.g., by the searching users, or other users). In some examples, each template includes an associated weight, which is set to a default value upon creation (e.g., weight=0). Consequently, most-recent templates can be identified as those having an initial weight. In some examples, as a template is used, the weight is incremented. Consequently, popular templates can be identified as having higher value weights (e.g., weights that exceed a threshold value).

In some implementations, the descriptive text platform provides editing tools. Example editing tools can include, without limitation, font style, font color, italics, bold, underling, and the like. In some examples, tools can be provided that enable the user to enable/disable the descriptive text as bullet points, and/or enable/disable voice output for each descriptive text.

FIGS. 3A-3H depict example screenshots in accordance with implementations of the present disclosure. The example screenshots depict example progressions for providing descriptive text, and editing underlying generic templates for descriptive text.

Figure 3A:
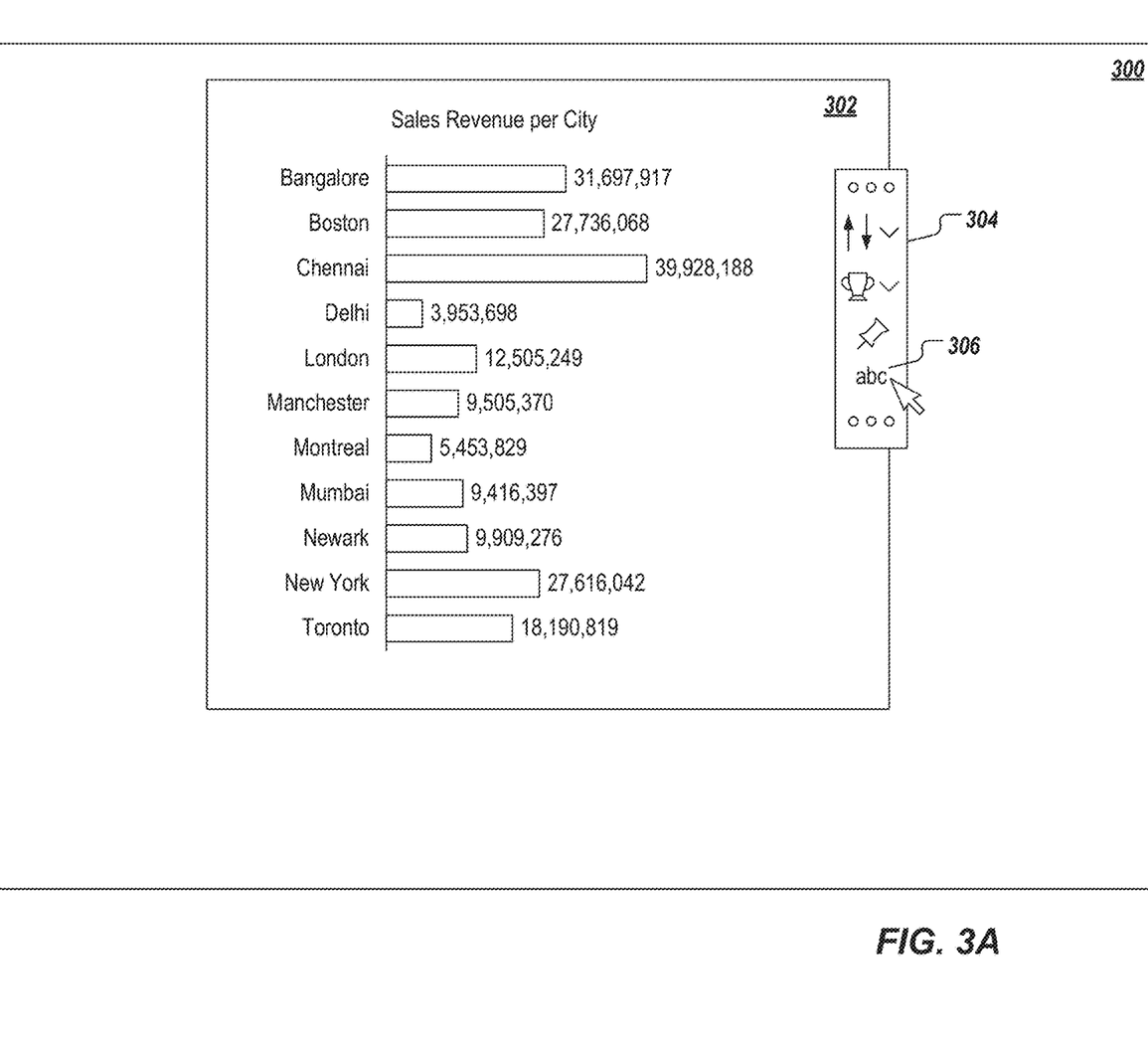
FIGS. 3A-3G depict example screenshots in accordance with implementations of the present disclosure.

FIG. 3A depicts a screenshot of an example user interface (UI) 300. In some examples, the UI 300 is provided by the descriptive text platform of the present disclosure. In some examples, the UI 300 is provided by an application that communicates with the descriptive text platform of the present disclosure. In the depicted example, the UI 300 displays a data visualization 302. The data visualization 302 includes a bar graph depicted a dimension, City, with respect to a measure, Sales Revenue. That is, in the depicted example, the data visualization 302 depicts Sales Revenue per City. In some examples, the data visualization 302 is generated based on analytical data that is provided (e.g., from an analytics application). Example analytics data can include a set of dimensions (e.g., DIM:[Quarter, City]), and a set of measures (e.g., Measures:[Sales Revenue, Margin]).

In some implementations, a menu 304 is displayed, and enables a user to interact with the data visualization 302, as described in further detail herein. In the depicted example, the menu 304 includes a descriptive text option 306. In some examples, the descriptive text option 306 can be selected (e.g., clicked on) by a user to instigate display of descriptive text that is generated for the data visualization 302.

Figure 3B:
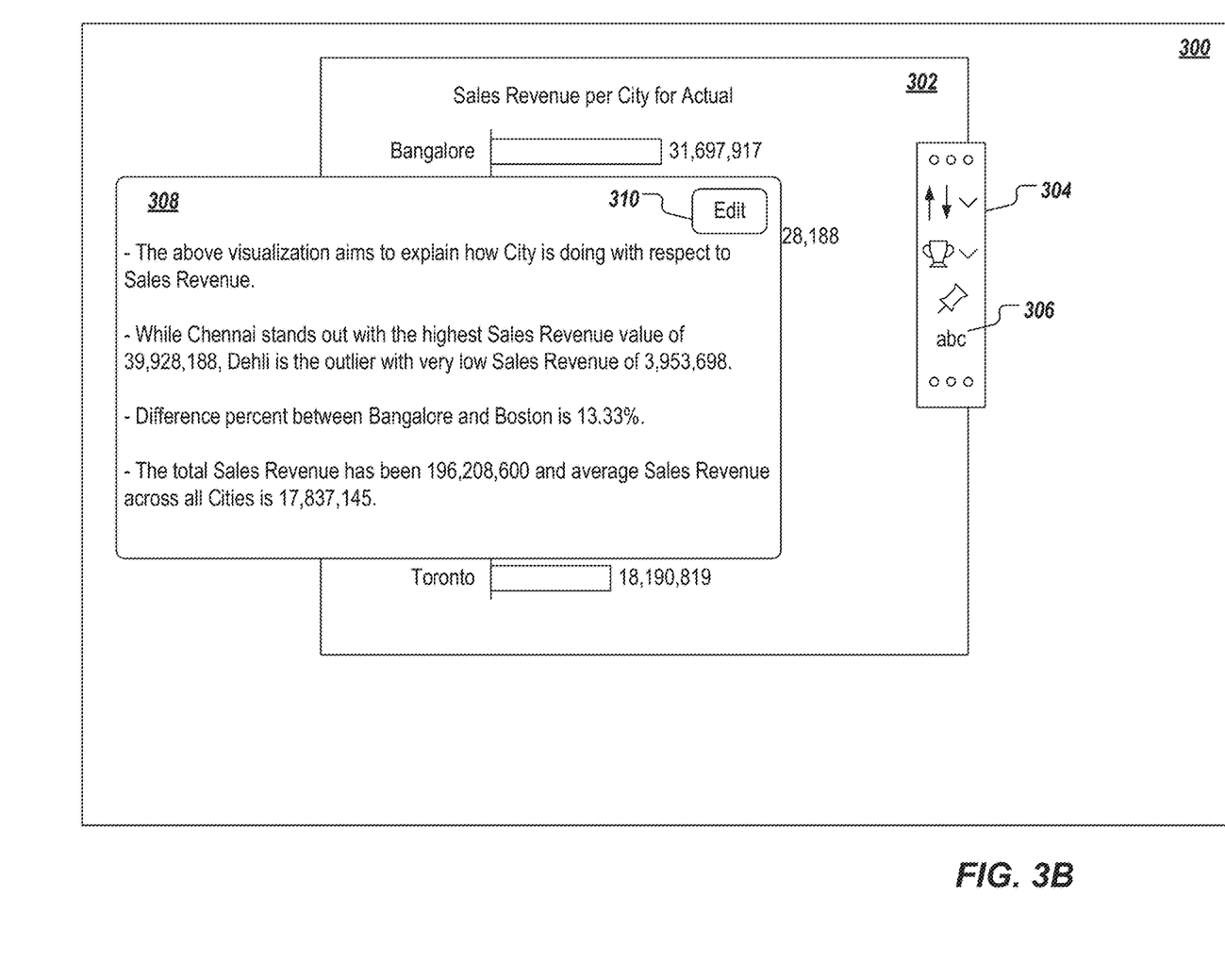

FIG. 3B depicts an example text box 308 that displays descriptive text for the data visualization 302. In some examples, the text box 308 is displayed in response to user selection of the descriptive text option 306 (e.g., in FIG. 3A). In some examples, the text box 308 initially displays default text provided for the data visualization 302. In the depicted example, the text depicted in the text box 308 includes multiple (four) statistics (referred to as key statistics). The text box 308 includes an edit option 310 that enables a user to instigate editing of the generic templates underlying the text displayed in the text box 308.

Figure 3C:
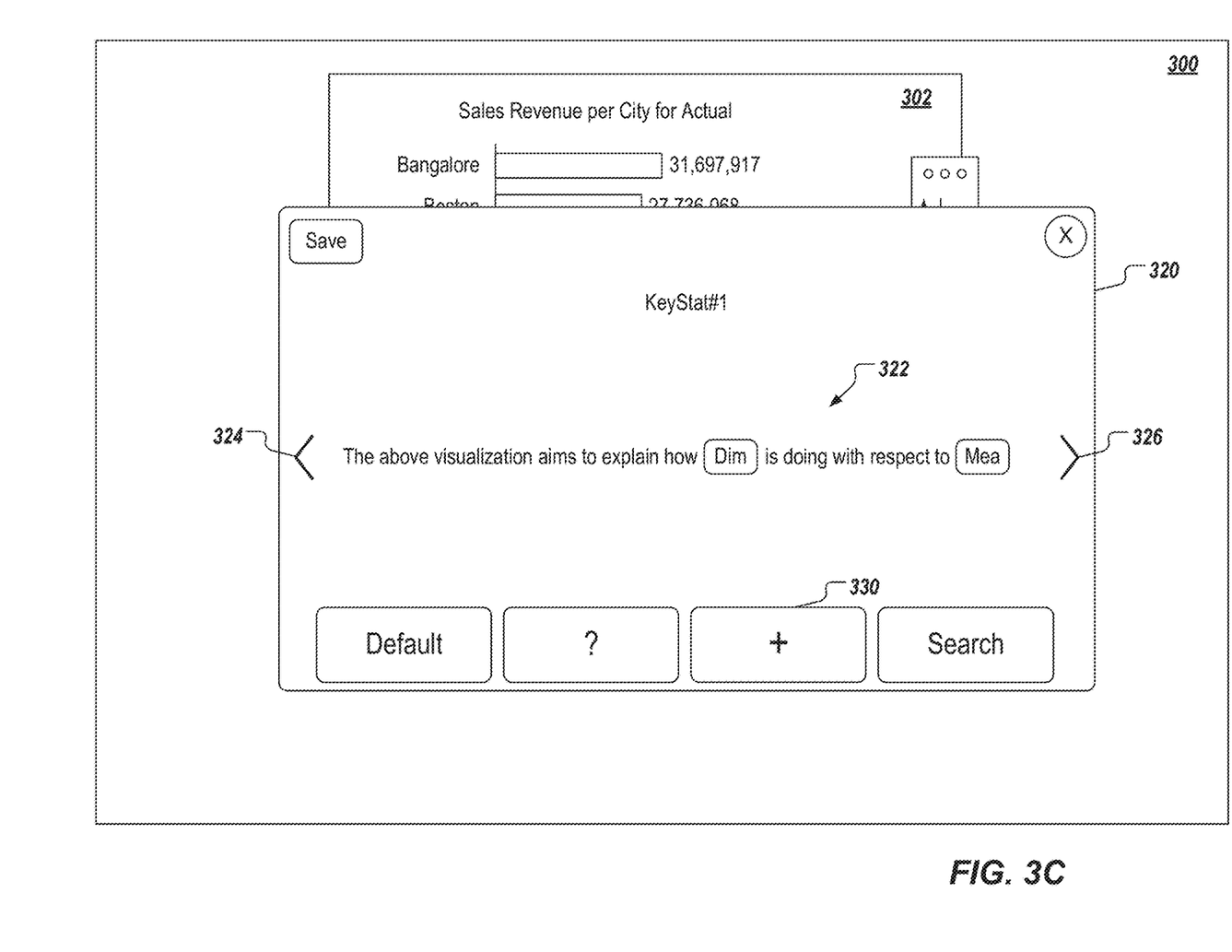
Figure 3D:
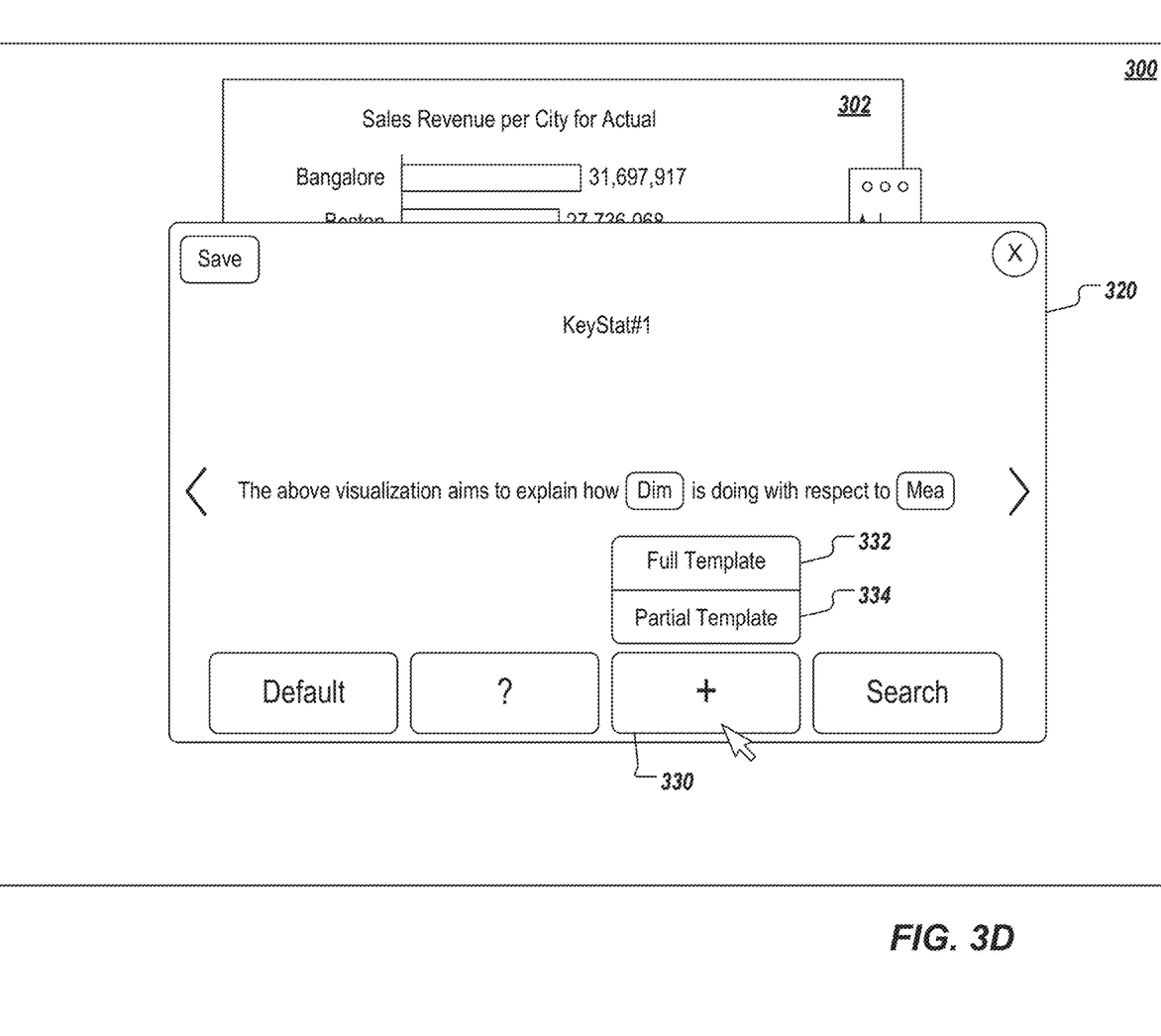

FIG. 3C depicts an example editor interface 320. In some examples, the editor interface 320 is displayed in response to user selection of the edit option 310 of the text box 308 of FIG. 3B. In some examples, the editor interface 320 displays a generic template corresponding to text displayed as a statistic. FIG. 3C depicts a generic template 322 corresponding to the first key statistic. In some examples, the editor interface 320 includes scroll elements 324, 326 that can be selected to scroll between templates. For example, the scroll element 326 can be selected to display the template for the second key statistic. As another example, the scroll element 324 can be selected to display the template for the fourth key statistic. The editor interface 320 includes editing options to instigate editing of the template 322. An editing option 330 can be selected to instigate editing of the template 322, as described in further detail herein.

Example editing of a template is described in further detail herein with reference to FIGS. 3D-3G. In some examples, in response to user selection of the editing option 330, template options 332, 334 are displayed, and respectively include a full template, and a partial template, described in detail herein. In some examples, in response to selection of one of the template options 332, 334, a template editing interface is provided. For example, in response to selection of the partial template option 334, a blank template editing interface is displayed within the template editing interface 340. That is, for example, a template placeholder (e.g., "Start typing your template here . . . ") can be displayed.

Figure 3E:
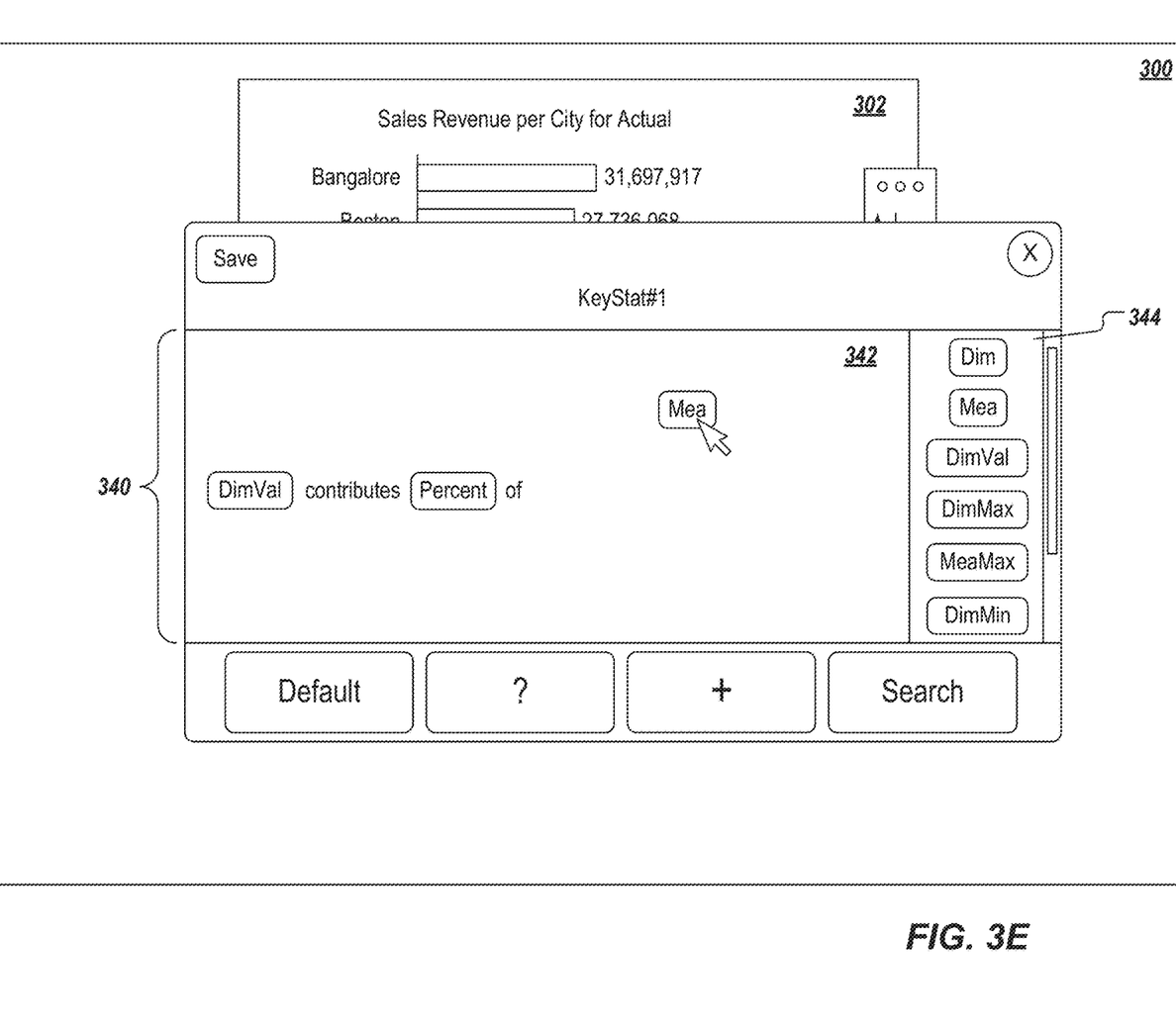

With particular reference to FIG. 3E, a template editing interface 340 is displayed, and includes a template editing window 342, and a function menu 344. As described herein, the user creates, and/or edits a template within the template editing window. In the depicted example, a template 342 is displayed, which is in progress. For example, the user has selected a dimension value function ([DimVal]) from the function menu 344, has typed in the text "contributes," has selected a percent formula function ([Percent]) from the function menu 344, and has typed in the text "of." Further, in the depicted example, the user has selected a measure function ([Mea]) from the function menu 344, which is being added to the template 342. In accordance with implementations of the present disclosure, function can be selected from the function menu 344, and can be added to the template 342 using drag-and-drop functionality. That is, the user can click on a function, hold the click, drag the function from the function menu 344, and drop the function (release the click) at a desired location within the template 342.

Figure 3F:
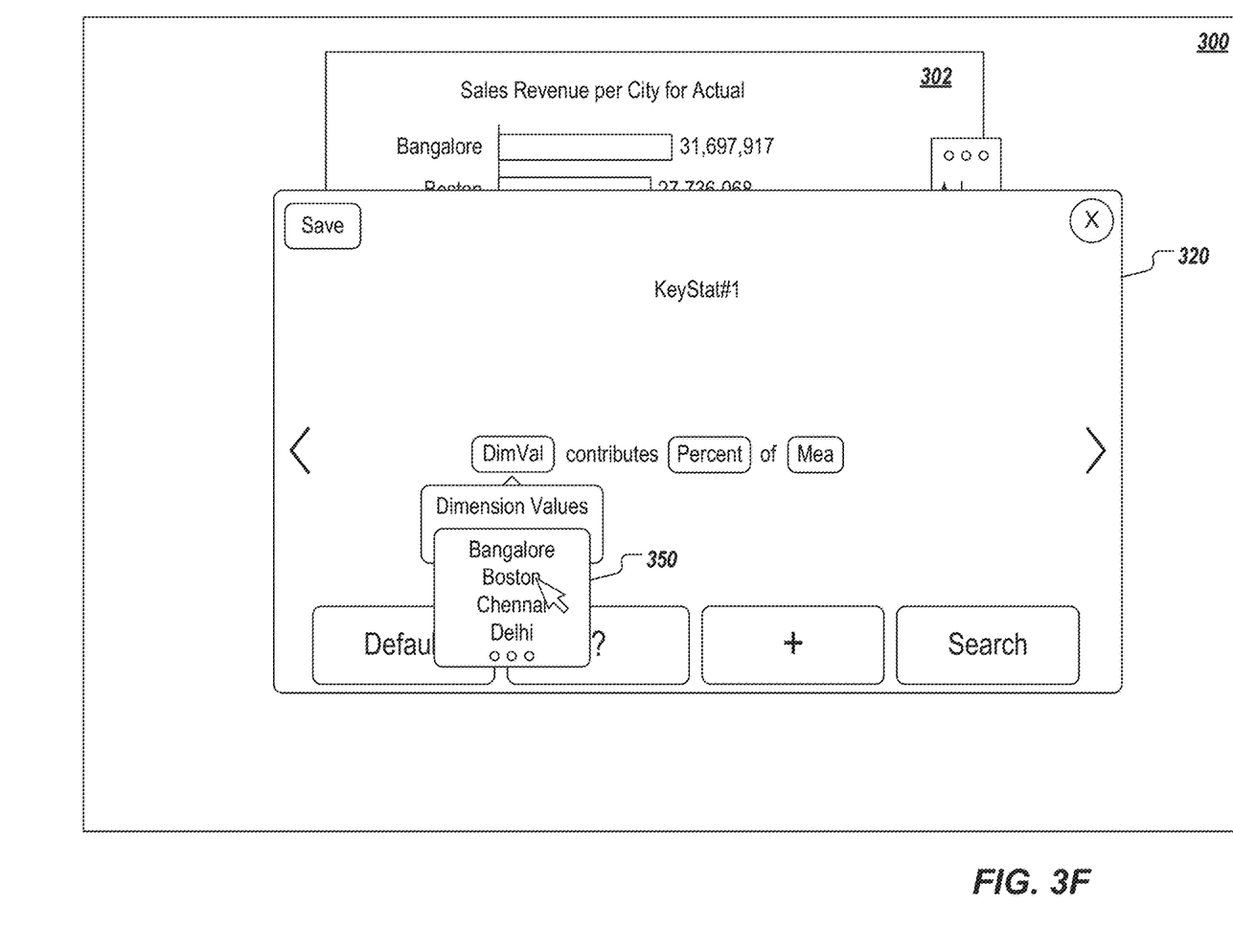
Figure 3G:
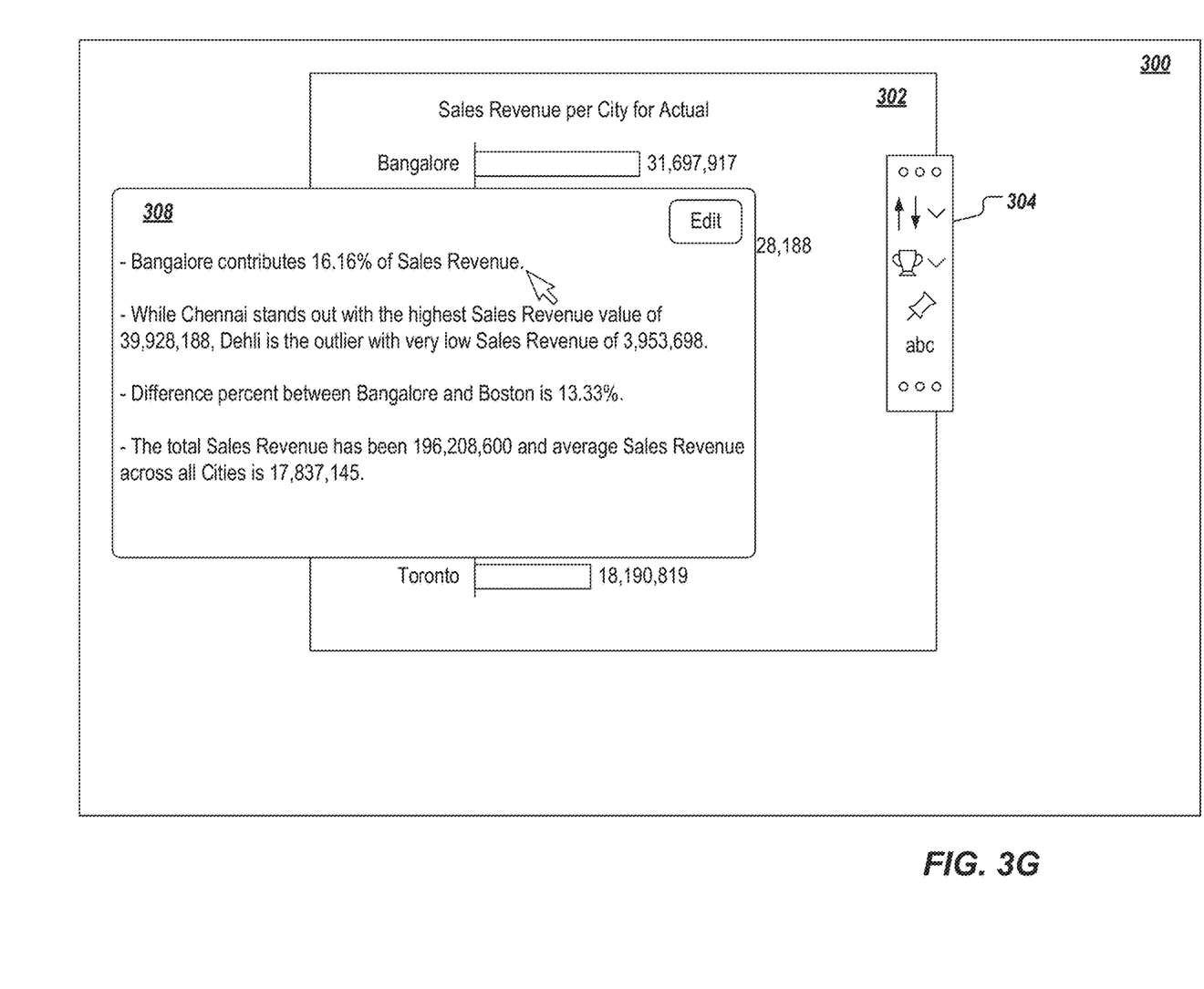

With particular reference to FIG. 3F, the template can be further customized by selecting particular values. In the example of FIG. 3F, the function [DimVal] is selected (e.g., right-clicked), and a list of values 350 is displayed. In some examples, the list of values 350 is provided based on the analytical data. A particular value (e.g., Bangalore) can be selected. In response, the resulting descriptive text is provided based on the selected values. For example, the functions [Percent] and [Mea] are calculated by the descriptive text platform. FIG. 3G depicts the resulting descriptive text.

Figure 4:
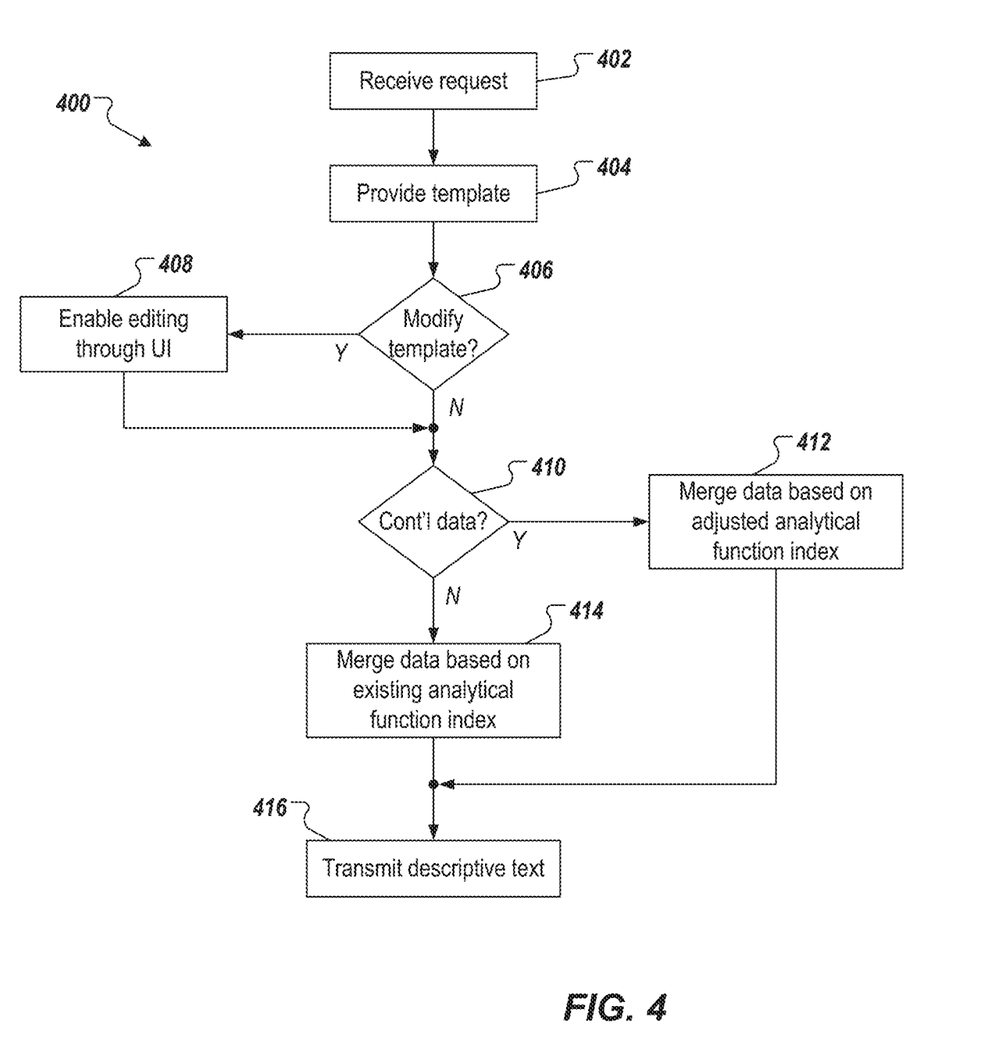
FIG. 4 depicts an example process that can be executed in accordance with implementations of the present disclosure.

FIG. 4 depicts an example process 400 that can be executed in accordance with implementations of the present disclosure. In some implementations, the example process 400 is provided as one or more computer-executable applications executed by one or more computing devices. In some examples, the example process 400 is executed by a descriptive text platform of the present disclosure.

A request is received (402). For example, a narrative application transmits a request for descriptive text to the descriptive text platform of the present disclosure. In some examples, the request includes analytical data. In some examples, the request includes data indicative of a type of visualization that the descriptive text is to be associated with. In some examples, the request includes contextual data that can be used to adjust one or more indices of analytical functions, as described herein. In some examples, the request includes a template identifier.

A template is provided (404). In some examples, a default template is provided based on a type of the visualization. In some examples, a custom template is retrieved from a data store based on a template identifier, if included with the request. It is determined whether the template is to be modified (406). For example, a user can provide user input indicating that the template is to be modified (e.g., the user clicking on the edit option 310 of FIG. 3B). If the template is to be modified, editing of the template is enabled through one or more user interfaces (UIs) (408). For example, and as described herein with reference to FIGS. 3C-3F, one or more UIs can be displayed that enable the user to modify the template (e.g., to create a custom template that is saved to a datastore). As described in detail, implementations of the present disclosure include drag-and-drop functionality that enables users to select analytical functions for inclusion in a template.

It is determined whether contextual data is provided (410). For example, the descriptive text platform can determine whether contextual data was included with the request. If contextual data is provided, the descriptive text platform merge analytical data with the template based on one or more adjusted analytical function indices (412). That is, an index of an analytical function of the template is adjusted based on the contextual data, as described by way of example herein. If contextual data is not provided, analytical data is merged with the template based on at least one analytical function index (414). That is, the analytical data is merged based on at least one index as included in the template. The resulting descriptive text is transmitted (416). For example, the descriptive text platform transmits the descriptive text to the narrative application for inclusion with at least one data visualization.

Figure 5:
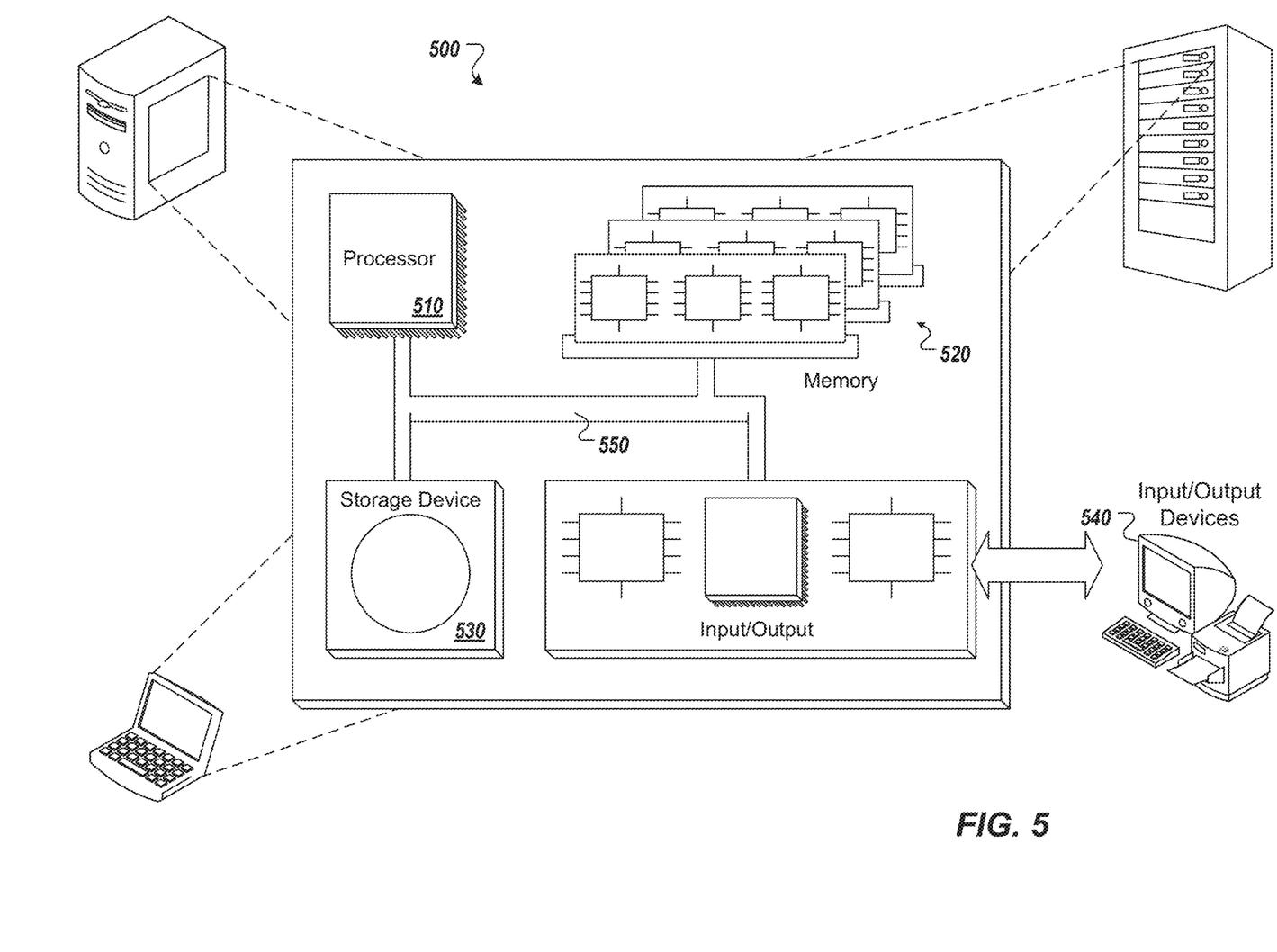
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard, and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically providing descriptive text to a narrative application, the method being executed by one or more processors and comprising:
   receiving, in a template editor, a request to edit a first template;
   receiving user inputs, in the template editor, to add at least two analytical functions to the first template, wherein each analytical function is configured to generate descriptive text based on an analytical function index, and wherein receiving the user inputs comprises receiving an add dimension value function input and an add measure function input;
   adding the at least two analytical functions, including the dimension value function and the measure function, to the first template, in response to the user inputs, including embedding each analytical function in a natural language sentence in the first template;
   receiving, from the narrative application, a request for descriptive text, the request comprising analytical data, and data indicating the first template;
   determining whether contextual data is included in the request;
   in response to determining that contextual data is included in the request:
      for each analytical function included in the first template:
         adjusting, based on the contextual data and in the template and before the analytical function index is used by the analytical function, the analytical function index to create an adjusted analytical function index for use by the analytical function; and
         in response to the request and after the adjusting, merging at least a portion of the analytical data and the template to provide a descriptive text, the merging being executed using at least one regular expression and including calculation of a function value of the analytical function, wherein the analytical function references the adjusted analytical function index and determines the function value based on the adjusted analytical function index, and wherein generating the descriptive text comprises replacing, in the natural language sentence, the analytical function with the function value; and
      transmitting a response to the narrative application, the response comprising the descriptive text.

2. The method of claim 1, wherein the data indicating a template comprises a chart type, the template comprising a default template that is selected based on the chart type.

3. The method of claim 1, wherein the data indicating a template comprises a template identifier, the template being retrieved from a datastore based on the template identifier.

4. The method of claim 1, wherein the at least one regular expression is determined to match at least a portion of the template.

5. The method of claim 1, further comprising modifying the template based on user input indicating selection of an analytical function that is to be added to the template, the analytical function being added to the template using drag-and-drop functionality of a user interface.

6. The method of claim 1, further comprising:
   in response to determining that contextual data is not included in the request, calculating the function value based on the analytical function index rather than on the adjusted analytical function index.

7. A non-transitory computer-readable storage medium coupled to one or more processors and having instructions stored thereon which, when executed by the one or more processors, cause the one or more processors to perform operations for automatically providing descriptive text to a narrative application, the operations comprising:
   receiving, in a template editor, a request to edit a first template;
   receiving user inputs, in the template editor, to add at least two analytical functions to the first template, wherein each analytical function is configured to generate descriptive text based on an analytical function index, and wherein receiving the user inputs comprises receiving an add dimension value function input and an add measure function input;
   adding the at least two analytical functions, including the dimension value function and the measure function, to the first template, in response to the user inputs, including embedding each analytical function in a natural language sentence in the first template;
   receiving, from the narrative application, a request for descriptive text, the request comprising analytical data, and data indicating the first template;
   determining whether contextual data is included in the request;
   in response to determining that contextual data is included in the request:
      for each analytical function included in the first template:
         adjusting, based on the contextual data and in the template and before the analytical function index is used by the analytical function, the analytical function index to create an adjusted analytical function index for use by the analytical function; and
         in response to the request and after the adjusting, merging at least a portion of the analytical data and the template to provide a descriptive text, the merging being executed using at least one regular expression and including calculation of a function value of the analytical function, wherein the analytical function references the adjusted analytical function index and determines the function value based on the adjusted analytical function index, and wherein generating the descriptive text comprises replacing, in the natural language sentence, the analytical function with the function value; and
      transmitting a response to the narrative application, the response comprising the descriptive text.

8. The non-transitory computer-readable storage medium of claim 7, wherein the data indicating a template comprises a chart type, the template comprising a default template that is selected based on the chart type.

9. The non-transitory computer-readable storage medium of claim 7, wherein the data indicating a template comprises a template identifier, the template being retrieved from a datastore based on the template identifier.

10. The non-transitory computer-readable storage medium of claim 7, wherein the at least one regular expression is determined to match at least a portion of the template.

11. The non-transitory computer-readable storage medium of claim 7, wherein operations further comprise modifying the template based on user input indicating selection of an analytical function that is to be added to the template, the analytical function being added to the template using drag-and-drop functionality of a user interface.

12. A system, comprising:
a computing device; and
a non-transitory computer-readable storage device coupled to the computing device and having instructions stored thereon which, when executed by the computing device, cause the computing device to perform operations for automatically providing descriptive text to a narrative application, the operations comprising:
receiving, in a template editor, a request to edit a first template;
receiving user inputs, in the template editor, to add at least two analytical functions to the first template, wherein each analytical function is configured to generate descriptive text based on an analytical function index, and wherein receiving the user inputs comprises receiving an add dimension value function input and an add measure function input;
adding the at least two analytical functions, including the dimension value function and the measure function, to the first template, in response to the user inputs, including embedding each analytical function in a natural language sentence in the first template;
receiving, from the narrative application, a request for descriptive text, the request comprising analytical data, and data indicating the first template;
determining whether contextual data is included in the request;
in response to determining that contextual data is included in the request:
for each analytical function included in the first template:
adjusting, based on the contextual data and in the template and before the analytical function index is used by the analytical function, the analytical function index to create an adjusted analytical function index for use by the analytical function; and
in response to the request and after the adjusting, merging at least a portion of the analytical data and the template to provide a descriptive text, the merging being executed using at least one regular expression and including calculation of a function value of the analytical function, wherein the analytical function references the adjusted analytical function index and determines the function value based on the adjusted analytical function index, and wherein generating the descriptive text comprises replacing, in the natural language sentence, the analytical function with the function value; and
transmitting a response to the narrative application, the response comprising the descriptive text.

13. The system of claim 12, wherein the data indicating a template comprises a chart type, the template comprising a default template that is selected based on the chart type.

14. The system of claim 12, wherein the data indicating a template comprises a template identifier, the template being retrieved from a datastore based on the template identifier.

15. The system of claim 12, wherein the at least one regular expression is determined to match at least a portion of the template.

* * * * *